(12) United States Patent  (10) Patent No.: US 8,820,348 B2
Bassett  (45) Date of Patent: Sep. 2, 2014

(54) RADIAL FLOW OSCILLATING VALVE FOR RECIPROCATING COMPRESSORS AND PUMPS

(76) Inventor: H. Eugene Bassett, Sugar Land, TX (US)

( * ) Notice: Subject to any disclaimer, the term of this patent is extended or adjusted under 35 U.S.C. 154(b) by 1297 days.

(21) Appl. No.: 12/536,638

(22) Filed: Aug. 6, 2009

(65) Prior Publication Data

US 2010/0032029 A1 Feb. 11, 2010

Related U.S. Application Data

(60) Provisional application No. 61/086,885, filed on Aug. 7, 2008.

(51) Int. Cl.
  *F16K 15/02* (2006.01)
(52) U.S. Cl.
  USPC ............... 137/527; 137/512; 137/516.11

(58) Field of Classification Search
  CPC ... F16K 15/033; F16K 15/035; F16K 15/026; F04B 39/106; F04B 39/10
  USPC ............ 137/512, 512.1, 516.11, 516.25, 527, 137/625.19, 625.21, 625.47; 251/313, 88, 251/284, 310
  See application file for complete search history.

(56) References Cited

U.S. PATENT DOCUMENTS 922,986 A * 5/1909 Westaway ................ 137/516.11
2,011,547 A * 8/1935 Campbell ................ 137/516.29

* cited by examiner

*Primary Examiner* — Kevin Lee
*Assistant Examiner* — Macade Brown
(74) *Attorney, Agent, or Firm* — H. Eugene Bassett (57) ABSTRACT

The invention provides a unique self actuating oscillating valve and suggests means to control flow.

1 Claim, 10 Drawing Sheets

RADIAL FLOW OSCILLATING VALVE FOR RECIPROCATING COMPRESSORS AND PUMPS

RELATED APPLICATIONS

The present application is a continuation application of U.S. provisional patent application, Ser. No. 61/086,885, filed Aug. 7, 2008, for RADIAL FLOW OSCILLATING VALVE FOR RECIPROCATING COMPRESSORS AND PUMPS, by H. Eugene Bassett PE, included by reference herein and for which benefit of the priority date is hereby claimed.

FIELD OF THE INVENTION

This present invention relates to valves that may be used primarily for intake and optionally outlet of gases or liquids for reciprocating compressors and pumps. The present invention also suggests greatly simplified stepless unloading controls.

BACKGROUND OF THE INVENTION

Figure 7:
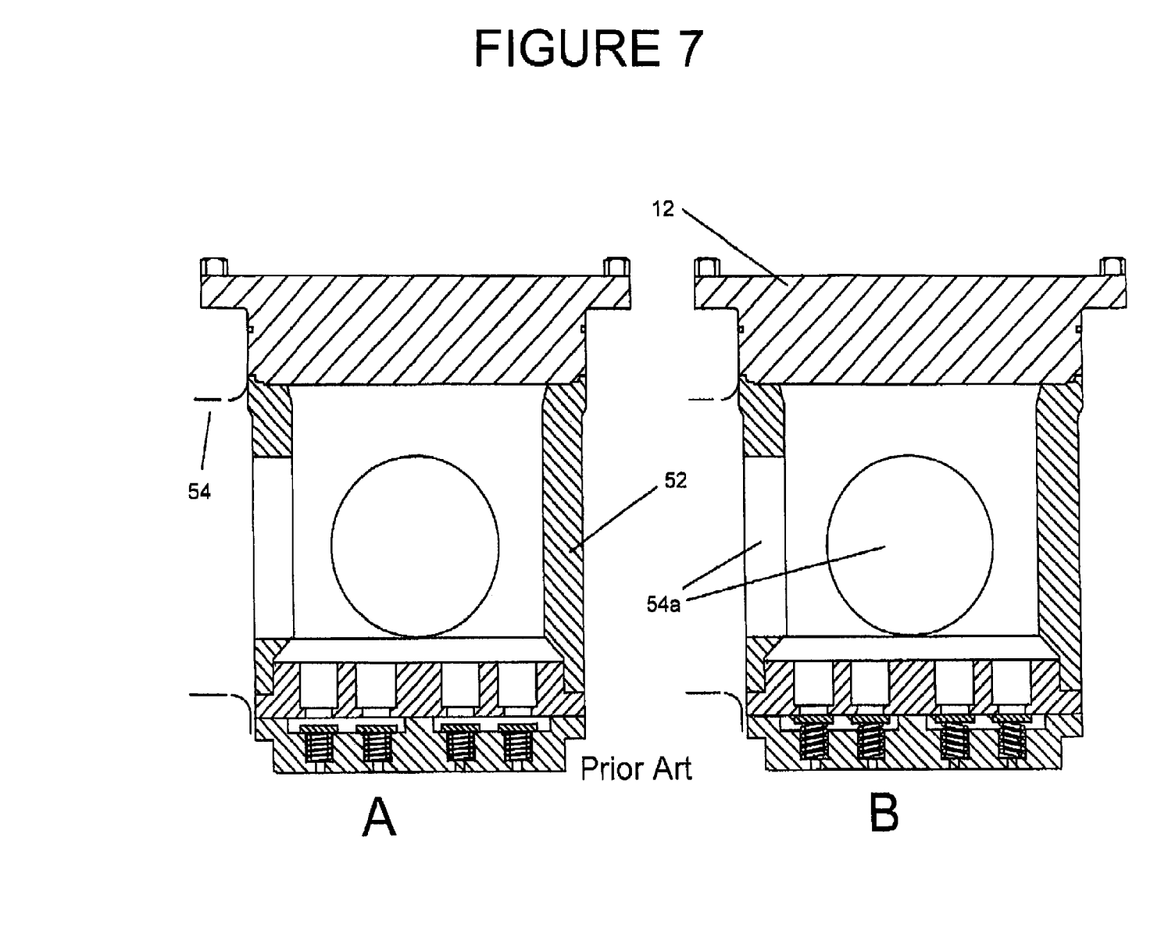
FIG. 7 is a cross section view of a prior art showing FIG. 7a open position and FIG. 7b closed position.

The operative portion of a reciprocating compressor or pump includes at least one piston and cylinder assembly with intake and exhaust valves typically located at or near one of the cylinder heads. It is commonly known to use the same form of valve for both inlet and outlet by simply reversing the position of the valve for the two uses. One such valve is disclosed in U.S. Pat. No. 5,511,583 by Bassett which has singular annular valve elements. FIG. 7 shows typical prior art.

Ever since the self actuating automatic compressor valve was introduced the basic concept has remained unchanged. There have been major changes primarily to internal component configuration and materials however the valve elements still reciprocate in a to and fro manner in response to internal pressure changes.

Compressor valves are the most common and expensive components associated with unplanned compressor shutdowns. The usual problems are broken sealing elements and springs and to a lesser degree damaged seats and guards.

Unloading for start-up is generally accomplished by by-passing the inlet to outlet pressure, Finger/fork type unloaders hold the valve plates open through brute force or plug type unloaders.

Adding Finger/fork type unloaders compounds the potential problems due to the need to maintain proper mechanical clearances and the vulnerability of delicate valve components. Whenever changes are made to valves such as lift or seats remachined the unloader to valve clearance requires remachining.

It is also known to (A) fully unload a compressor cylinder ends by holding the inlet valve plates open during the compression event and (B) partially unload by reverse flow capacity control by holding the inlet valve plates open during a portion of the compression event. Either of these unloading methods may cause short compressor run times.

Unloading by method (A) requires very exacting manufacturing techniques as well as knowledge current operating conditions. Unloading by method (B) requires all the conditions of (A) plus analysis of unloader back-flow drag forces on the valve plates which can be significant and increase with mol weight and inlet pressure.

The present invention can overcome these shortcomings as will be described in the Summary.

SUMMARY OF THE INVENTION

Throughout this discussion the term "gas" is understood to mean gas, air or any other fluid.

The present invention differs from prior art see (FIG. 7) which is typical and all operating and functional comparisons are made relative to this prior art structure.

Unloading for start-up is generally accomplished by de-activating inlet valves either by Finger/fork type unloaders that hold the valve plates open through brute force or plug type unloaders.

Adding Finger/fork type unloaders introduce potential problems due to the need to maintain specified mechanical clearances between the valve and unloader whenever changes are made to valves such as lift or seats re-machined.

It is also known to (A) fully unload compressor cylinder ends by holding the inlet valve plates open as illustrated in FIG. 7A during the compression event and (B) partially unload by reverse flow capacity control by holding the inlet valve plates open during a portion of the compression event.

Either of these unloading methods may cause short compressor run times. Unloading by method (A) requires very exacting manufacturing techniques as well as knowledge current operating conditions.

Unloading by method (B) requires all the conditions of (A) plus analysis of unloader back-flow drag forces on the valve plates which can be significant and increase with mol weight and inlet pressure.

Prior art valves for reciprocating machines were initially limited to manufacturing equipment available at the time. With advances in manufacturing techniques such as CNC machines more complex design possibilities are becoming practical.

The present invention oscillates radially between open and closed positions in response to internal pressure changes. The oscillating valve is the first major improvement since automatic self actuating valves were introduced.

Figure 1A:
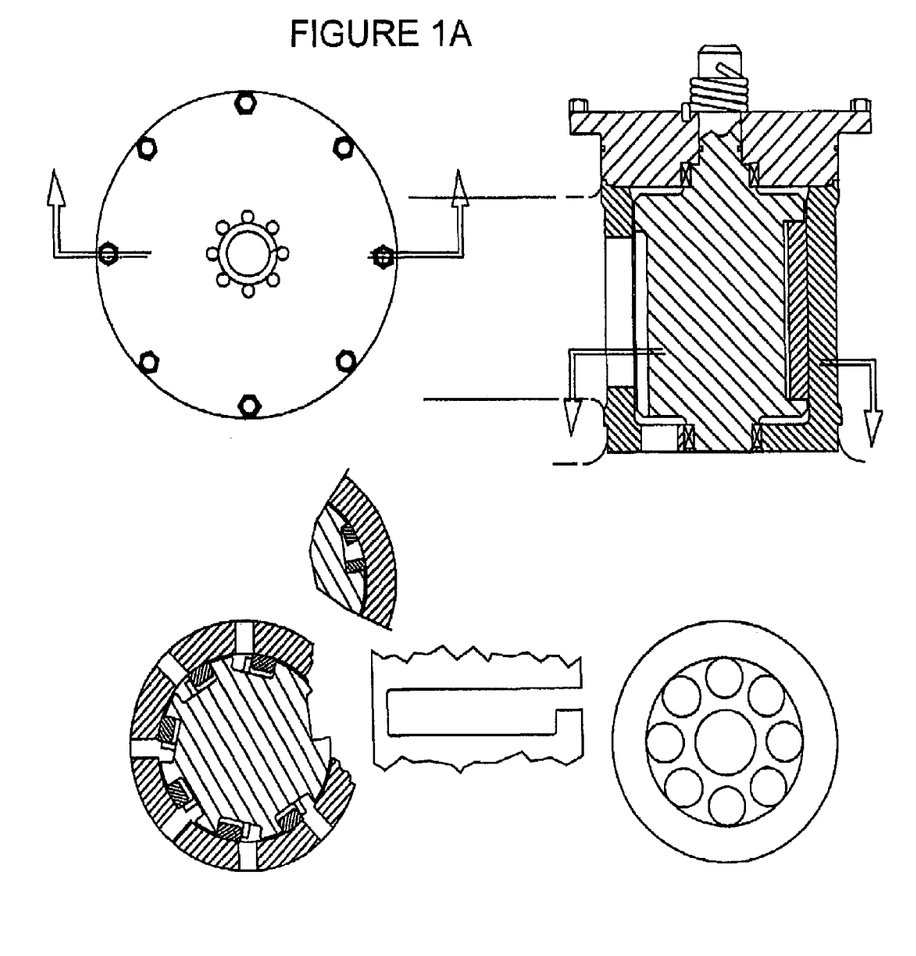
FIG. 1A and FIG. 1B are composite views of all drawing figures.
Figure 1B:
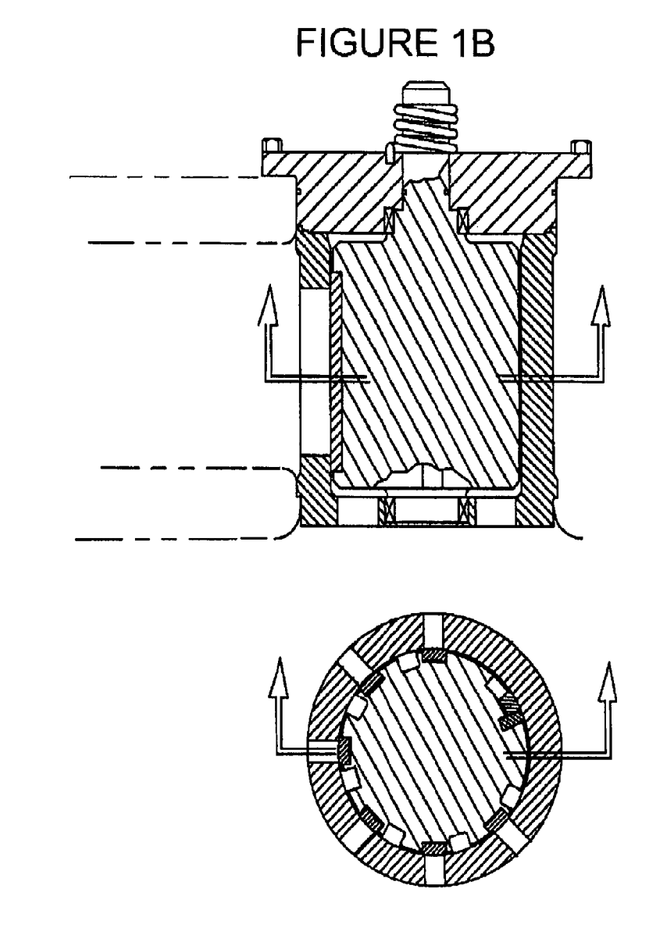
Figure 3:
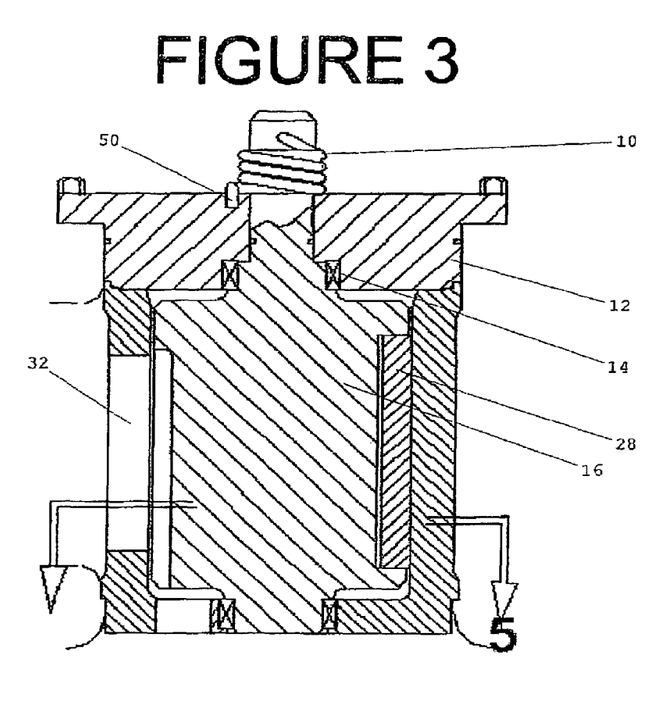
FIG. 3 is a longitudinal section view of the device in the open position.
Figure 4:
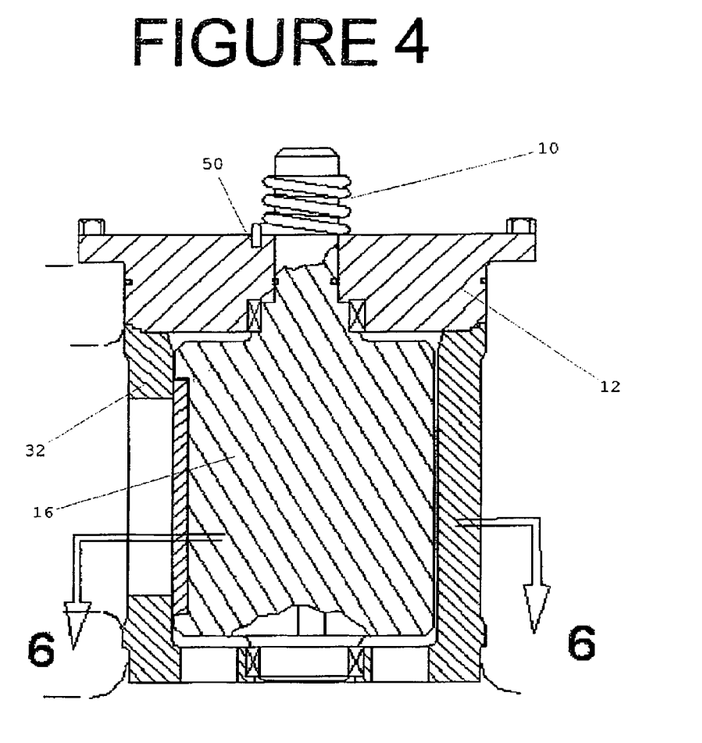
FIG. 4 is a longitudinal section view of the device in the closed position.
Figure 5:
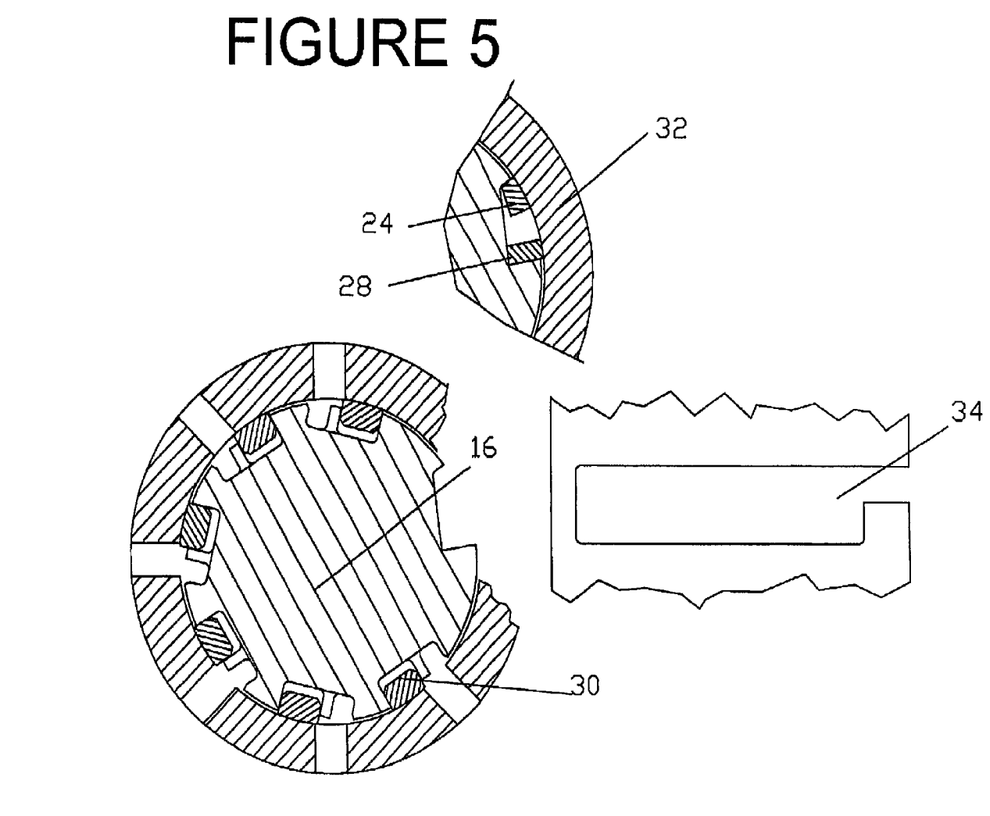
FIG. 5 is a section view of the device in the open position.
Figure 6:
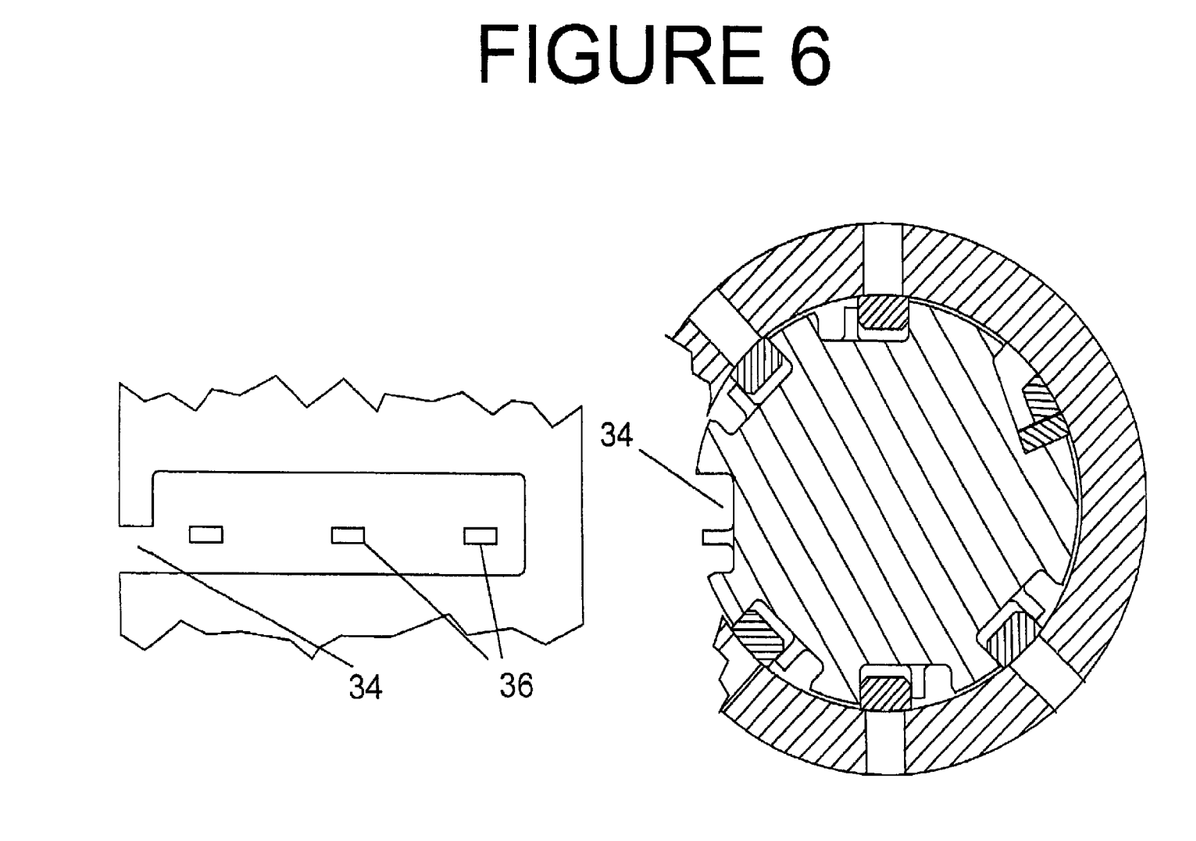
FIG. 6 is a section view of the device in the open position.

FIG. 1A in conjunction with FIG. 1B illustrate basic details to construct a radial flow oscillating valve. FIG. 3 and FIG. 5 shows the valve in its open position while FIG. 4 and FIG. 6 shows it in the closed position.

Note that the valve the seal elements consist of multiple or singular straight strips that block or allow compressed media to flow through ports. The present invention has one or more external springs biasing it closed. i.e. toward its seating surface in oscillating movement.

The external spring(s) is a major improvement that allows replacement of broken springs and/or change spring loads without removing and dismantling the complete valve assembly. This feature alone will significantly reduce operating and maintenance costs.

Various objects, features and advantages of the invention will be appreciated by the following detail description, drawings and the claim.

Those familiar with prior art devices will instantly appreciate the simplicity and advantages of the present invention.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

FIG. 1A and FIG. 1B shows all drawing figures in accordance with the present invention.

Figure 2:
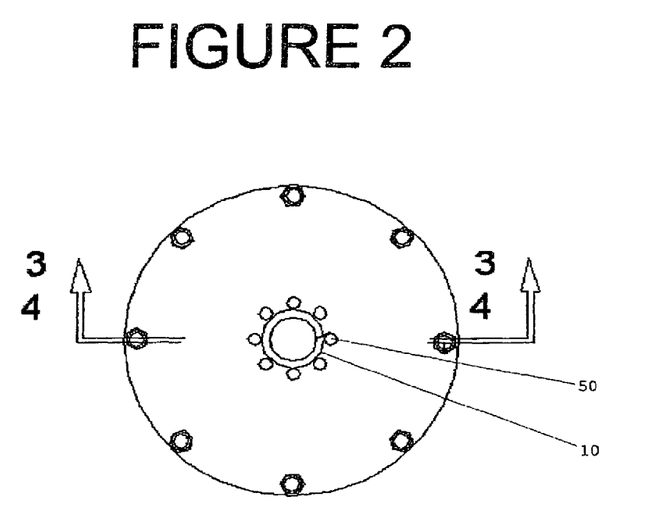
FIG. 2 is top plan view of the device.

FIG. 2 is a top view of the invention drawings, when considered in conjunction with the subsequent, detailed description, in which:

FIG. 3 is a longitudinal section of the device in the open position 60. Spring 10 returns radial oscillating member 16 in the static cylinder with flow ports 32 to the open flow position.

FIG. 4 is a longitudinal section of the device in the closed position 58. The radial oscillating member 16 in the static cylinder with flow ports 32 is in the closed flow position.

FIG. 5 is a section of the device in the open position 60 showing oscillation stop 24 and oscillator drive seal 28 as well as internal gas pressure 34.

FIG. 6 is a section of the device in the closed position 58 showing plate guide lugs 36 and as well as internal gas pressure 34.

As the internal gas pressure 34 develops load that exceeds spring 10 force the radial oscillating member 16 rotates in the static cylinder with flow ports 32 to oscillation stop 24 which is the open position 60 and allows fluid to flow then the developed energy in spring 10 returns radial oscillating member 16 to the closed position 58. Initial force of spring 10 may be changed by selecting different spring adjusting holes 50.

In summary; there is provided an advanced compressor/pump valve concept that oscillates between open and closed positions in response to internal gas pressure 34 changes just like prior art (FIG. 7) devices. The main difference between prior art and the present invention is the external spring 10, static cylinder with flow ports 32 and radial oscillating member 16. These features, in combination eliminate valve plate breakage due to impact and provide greatly simplified unloading by a system such as a fixed or adjustable dashpot orifice due to elimination of need for high force.

Figure 8:
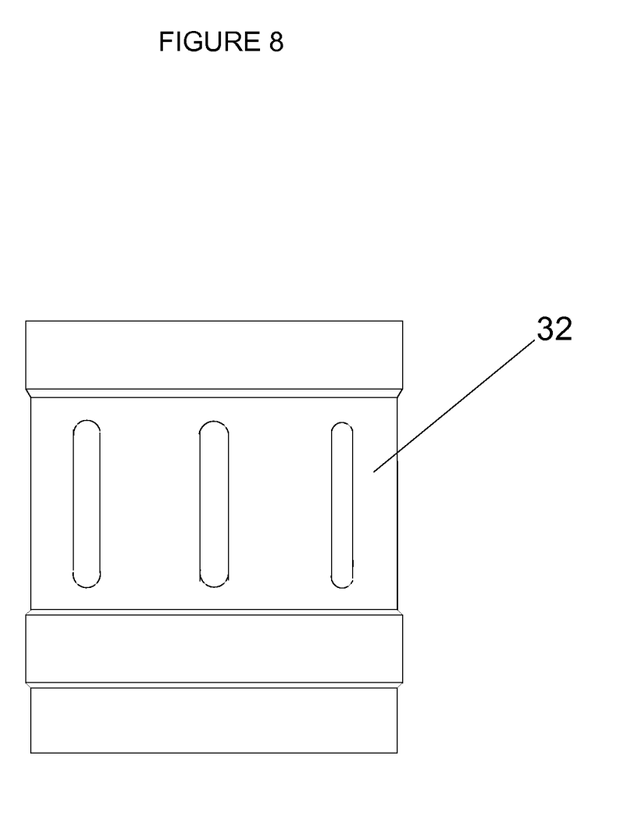
FIG. 8 is an exterior view of the static cylinder with flow ports 32.
Figure 9:
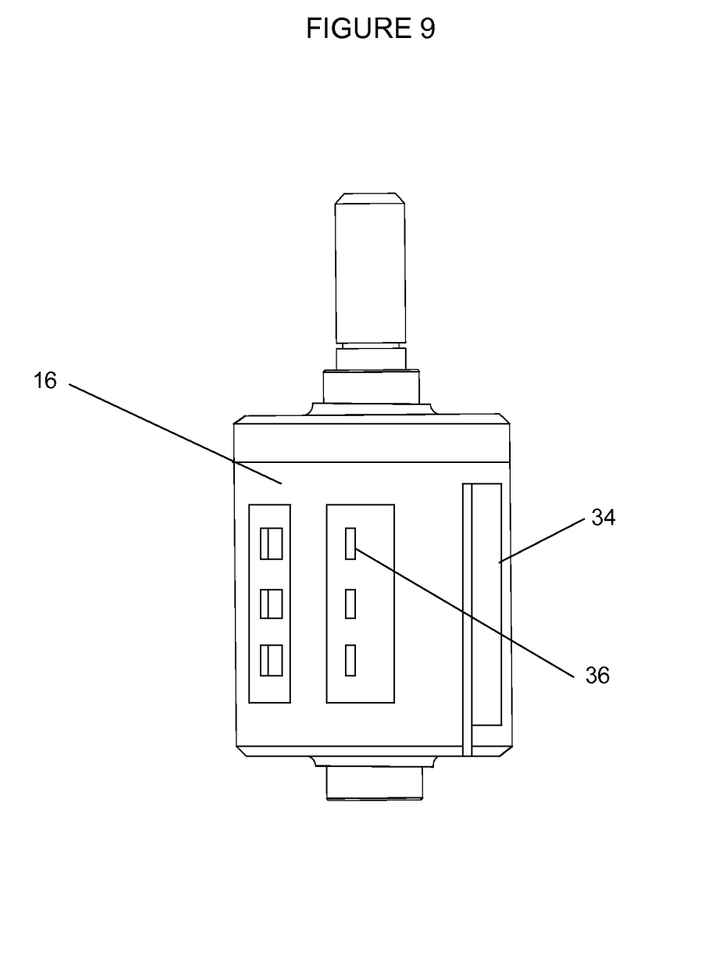
FIG. 9 is an exterior view of the radial oscillating member 16.

FIG. 8 shows an external view of the static cylinder with flow ports 32 and FIG. 9 shows an external view of the radial oscillating member 16. These are simplified basic concepts with several possibilities for fabrication.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A valve to control the intake and outlet of gases or liquids for reciprocating compressors and pumps comprising:
    a radially oscillating valve member moving in a rotational direction between a closed position and an open position; a valve cover including a plurality of spring adjusting holes; an external spring having a spring force and biasing said valve member towards said closed position, whereby said spring force is changed by selecting one of said spring adjusting holes at a top of said valve cover; a static cylinder including a plurality of radially positioned flow ports and a plurality of radially placed straight strips that block or allow a compressed media to flow through said flow ports; one or more stop surfaces per strip that are fixed to limit an angular movement of said strips, and the external spring biasing said strips towards a seating surface; as an internal gas pressure of said compressed media develops a load that exceeds said spring force, said valve member rotates in said static cylinder towards an oscillation stop to said open position, and allows said compressed media to flow through said flow ports; a developed energy in said spring returns said valve member to said closed position.

* * * * *